United States Patent
Sha et al.

(10) Patent No.: US 11,595,271 B2
(45) Date of Patent: Feb. 28, 2023

(54) DIGITAL TWIN ARCHITECTURE FOR MULTI-ACCESS EDGE COMPUTING ENVIRONMENT

(71) Applicant: EMC IP Holding Company LLC, Hopkinton, MA (US)

(72) Inventors: Danqing Sha, Shanghai (CN); Zhen Jia, Shanghai (CN); Kenneth Durazzo, Morgan Hill, CA (US); Min Zhao, Shanghai (CN); Anzhou Hou, Shanghai (CN); Bin He, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/380,372

(22) Filed: Jul. 20, 2021

(65) Prior Publication Data

US 2023/0026782 A1   Jan. 26, 2023

(51) Int. Cl.
*H04L 41/22* (2022.01)
*H04L 41/12* (2022.01)
*H04L 41/147* (2022.01)
*H04L 41/16* (2022.01)
*H04L 41/14* (2022.01)
*H04L 67/1001* (2022.01)

(52) U.S. Cl.
CPC ............ *H04L 41/22* (2013.01); *H04L 41/12* (2013.01); *H04L 41/145* (2013.01); *H04L 41/147* (2013.01); *H04L 41/16* (2013.01); *H04L 67/1001* (2022.05)

(58) Field of Classification Search
CPC ....... H04L 41/22; H04L 41/12; H04L 41/145; H04L 41/147; H04L 41/16; H04L 67/1001
See application file for complete search history.

(56) References Cited

U.S. PATENT DOCUMENTS

| | | | |
|---|---|---|---|
| 11,283,863 B1* | 3/2022 | Cleaver | G06N 20/00 |
| 2020/0026575 A1* | 1/2020 | Guim Bernat | G06F 9/485 |
| 2020/0244722 A1* | 7/2020 | Jeuk | H04L 43/08 |
| 2022/0029930 A1* | 1/2022 | Yilma | H04L 41/122 |
| 2022/0076151 A1* | 3/2022 | Loesch | G06N 7/005 |
| 2022/0167262 A1* | 5/2022 | Ding | H04L 67/1001 |
| 2022/0173979 A1* | 6/2022 | Wickes | H04L 41/22 |

OTHER PUBLICATIONS

Sun et al., Reducing Offloading Latency for Digital Twin Edge Networks in 6G, IEEE Transactions on Vehicular Technology, vol. 69, No. 10, Oct. 2020, p. 1-20 (Year: 2020).*
ETSI, "MEC in 5G Networks," White Paper No. 28, ISBN No. 979-10-92620-22-1, Jun. 2018, 28 pages.
ETSI, "Multi-access Edge Computing (MEC); Application Mobility Service API," Group Specification MEC 021 V2.1.1, Jan. 2020, 47 pages.
ETSI, "ETSI MEC: An Introduction," Apr. 2021, 39 pages.

* cited by examiner

*Primary Examiner* — Schquita D Goodwin
*Assistant Examiner* — Joseph M Cousins
(74) *Attorney, Agent, or Firm* — Ryan, Mason & Lewis, LLP

(57) ABSTRACT

Techniques are disclosed for generating a virtual representation (e.g., one or more digital twin models) of a multi-access edge computing system environment, and managing the multi-access edge computing system environment via the virtual representation. By way of example only, such techniques enable understanding, prediction and/or optimization of performance of applications and/or systems operating in the multi-access edge computing environment.

20 Claims, 6 Drawing Sheets

100

400

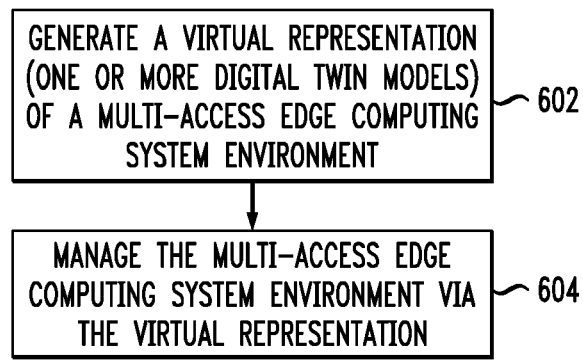
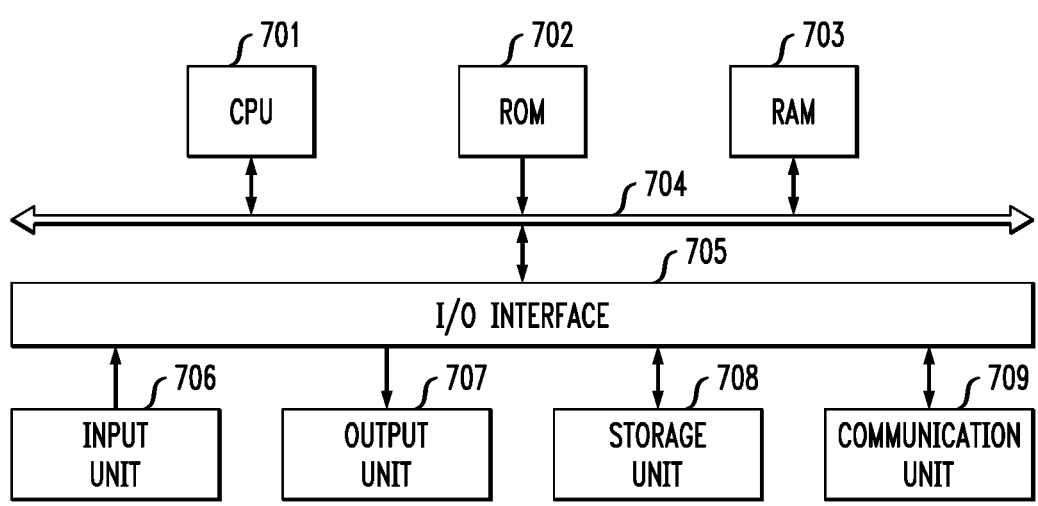

DIGITAL TWIN ARCHITECTURE FOR MULTI-ACCESS EDGE COMPUTING ENVIRONMENT

FIELD

The field relates generally to information processing systems, and more particularly to multi-access edge computing environments.

BACKGROUND

Edge computing, considered the evolution of cloud computing, migrates the deployment of application programs (applications) from a centralized data center downward to distributed edge nodes, thereby achieving shorter distances from data generated by consumers and the applications. Examples of applications include, but are not limited to, applications implementing artificial intelligence models such as, but not limited to, machine learning (ML) applications, deep learning (DL) applications, and data mining (DM) applications.

Edge computing is also considered an important technology for meeting 3GPP 5G key performance indicators (especially in terms of minimized delays and increased bandwidth efficiency). The 3GPP 5G system specification allows a multi-access edge computing (MEC) system and a 5G system to cooperate in operations related to traffic direction and policy controls. The MEC system is a European Telecommunications Standards Institute (ETSI) defined architecture that offers application developers and content providers cloud-computing capabilities and an information technology service environment at the edge of a network, e.g., at the edge of a cellular network such as a 5G system. However, due to the mobility of system users from one edge node to another, MEC implementation can present challenges.

SUMMARY

Embodiments provide techniques for construction and management of a virtual representation of a multi-access edge computing environment. According to one illustrative embodiment, a method comprises generating a virtual representation of a multi-access edge computing system environment, and managing the multi-access edge computing system environment via the virtual representation.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, illustrative embodiments provide techniques for constructing and managing a digital twin architecture in order to understand, predict and/or optimize performance of applications and/or systems operating in a multi-access edge computing environment.

These and other features and advantages of embodiments described herein will become more apparent from the accompanying drawings and the following detailed description.

BRIEF DESCRIPTION OF THE DRAWINGS

FIG. 6 illustrates a methodology for a digital twin architecture for a multi-access edge computing system according to an illustrative embodiment.

FIG. 7 illustrates a processing platform for an information processing system used to implement a digital twin architecture for a multi-access edge computing system according to an illustrative embodiment.

DETAILED DESCRIPTION

Figure 1:
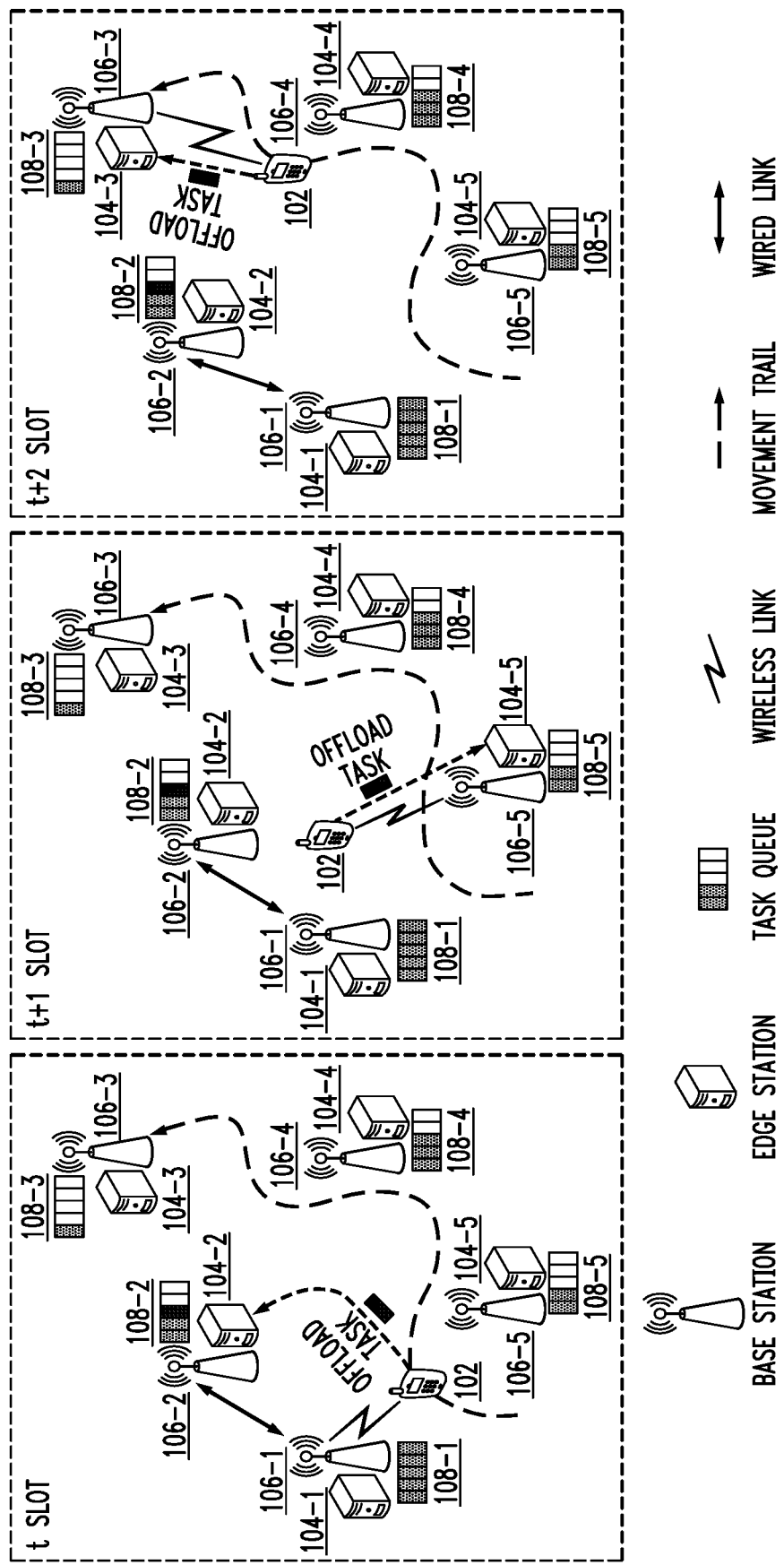
FIG. 1 illustrates a task offloading process in a physical multi-access edge computing system with which one or more illustrative embodiments can be implemented.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

As mentioned above in the background section, edge computing is an emerging technology developing together with emerging 5G (3GPP 5$^{th}$ Generation) telecommunication network technology (MEC system) and equipped with many applications for a variety of functions, by way of example only, autonomous driving, mobile mixed reality, drone pilot, smart home, Internet of Things (IoT) and virtual reality (VR) instructional tutorials and/or games, to name a few. Such applications typically need real-time responses or computing offload from servers, which cannot be adequately fulfilled by current cloud computing infrastructure. Thus, the emergence of edge computing is in response to the inability of centralized data centers to provide real-time or near-real-time compute capabilities to the vast (and growing) sources of decentralized data (so-called data "out in the wild"). Edge computing moves the computer workload closer to the consumer/data generator to reduce latency, bandwidth and overhead for the centralized data center and intermediate switches, gateways, and servers. However, it is realized herein that understanding, predicting and optimizing performance of applications and/or other systems operating in a MEC environment is challenging.

Accordingly, illustrative embodiments provide a digital twin architecture to overcome the above and other challenges. The term "digital twin" as illustratively used herein refers to a virtual representation (e.g., virtual copy) of a physical (e.g., actual or real) product, process, and/or system. By way of example, a digital twin can be used to understand, predict, and/or optimize performance of a physical product, process, and/or system in order to achieve improved operations in the computer processing environment in which the product, process, and/or system is implemented. Furthermore, a digital twin can act as a bridge between the physical and digital worlds and can be created by collecting real-time data about the physical product, process, and/or system (i.e., physical item). The data is then used to create a digital duplicate of the physical item, allowing it to be understood, analyzed, manipulated, and/or optimized.

More particularly, illustrative embodiments provide techniques for creating a digital twin architecture of a MEC environment including, as will be explained in further detail, an edge digital twin, a cloud digital twin, as well other components in the MEC system environment. The cloud digital twin and edge digital twin communicate with each other to enable a collaborative management system. In accordance with illustrative embodiments, the digital twin architecture for the MEC system has many functions including, but not limited to, acting as a digital copy of a real MEC system, and visualizing a 3D model, real-time data/status including network, CPU/storage usage, run time, latency, temperature, energy consumption, warning/alerts, etc. Further, the digital twin architecture is configured to simulate different workloads/frameworks based on user and other inputs and can be used for optimization design (redesign) of the MEC system based on workload/user trajectory/latency/cost/energy consumption, etc. Also, the digital twin architecture is configured to provide data analytics. For example, intelligent algorithms in the digital twin architecture: (i) analyze real-time data based on historical data and/or an existing knowledge database; (ii) generate optimization decisions for offloading; (iii) generate predictions for future operational trends; and (iv) generate management recommendations. Still further, the digital twin architecture, according to illustrative embodiments, is configured to provide remote monitoring and control, e.g., the ability to change/adjust parameters or settings for real MEC infrastructure by controlling the digital twin remotely.

Furthermore, the digital twin architecture for the MEC system has many advantages including, but not limited to, conveying and updating real-time information, and increasing efficiency and accuracy for MEC system management. The digital twin architecture can also provide a dynamic mobile offloading solution to tradeoff between service migration cost, latency and other parameters, based on needs of the user or other given scenarios. Further, by incorporating multi-physics simulation, data analytics, and machine learning capabilities, the digital twin architecture for the MEC system can demonstrate, for a system administrator or other user/system, the impact of design changes, usage scenarios, environmental conditions, and many other variables, thus eliminating the need for physical prototypes. The digital twin architecture also provides ease of collaboration between project members when using remote monitoring and control, and provides increased efficiency for management and operation by controlling functionalities in a virtual manner. By way of further advantage, the digital twin architecture provides increased automation and seamless control, with improved user experience, i.e., looking through a 3D immersive virtual environment in augmented reality/virtual reality (AR/VR) is much more intuitive than relying on conventional 2D models.

Still further, a digital twin architecture in accordance with illustrative embodiments can help an original equipment manufacturer (OEM) improve performance throughout the product lifecycle, increase reliability and availability, reduce risk, improve production, lower maintenance costs, and enable faster time to value. Also, a digital twin for an IoT/MEC architecture can help optimize system design and optimization, eliminating the need for physical prototypes, reducing development time, and improving the quality of the finalized solutions. Still further, a digital twin architecture can be provided to clients as a service.

In summary, by incorporating 3D modeling, multi-physics simulation and data analytics, the digital twin for a MEC system can make the optimization/management/monitoring much simpler, more effective, and more intuitive with better user experience. As mentioned, the digital twin architecture can also be deployed in AR/VR glass which provides a more intuitive virtual experience/interaction and thus better user experience. It could also be deployed in a PC, smart devices or other web-based tools. The digital twin architecture can also integrate with other emerging technologies such as, but not limited to, blockchain, 5G, etc.

Prior to describing illustrative embodiments of a digital twin architecture and methodology for a MEC system having the above and other advantages and functionalities, some challenges will first be described below.

It is realized herein that existing methodologies associated with MEC systems, when designing offloading schemes, do not consider the state of the surrounding environment of the user in uploading tasks, the time-varying nature of the environment, or user trajectory in the long run. Existing MEC system methodologies also ignore the dynamics of the edge servers or assume the states of edge servers. Besides, the existing offloading decision is mostly based on a purely mathematical solution, and there is no simulation and machine learning based optimization.

Current IT infrastructure managers may leverage a few different tools/platforms for hardware management, which requires different specialties for running the tools/platforms. Also, some of these tools are independent and not connected with each other, which reduces the management efficiency. As such, it is realized herein that instead of separated tools, an integrated MEC monitoring and management platform can resolve the problems above and increase MEC management and optimization efficiency. In addition, there is currently no optimization design and evaluation tool available for a MEC system, which can create simulations for different user scenarios and propose optimized solutions.

The current practice of data visualization of hardware status, environment parameters, IT infrastructure management process, etc. are shown in different tools, most of which are 2D-based visualizations. Such data presentation is not intuitive, and provides little or no insights.

Still further, it is realized herein that there are currently no intelligent algorithms or data analytics in existing IoT platform design for optimizing the offloading process between IoT devices and edges, e.g., how to better allocate resources, how to optimize the location of edge servers, how to reduce the total system latency, etc.

It is also realized herein that most IT infrastructure employees are not experts on all hardware systems in a given system environment, and thus on-site support is not always an option. For example, assume a support model that requires that: 1) the fault/error is detected; 2) the customer is notified; and 3) a technician must report within a specific service level agreement (SLA) time frame. Outside of core support hours, assume that a customer site is managed by a lower tier support individual (i.e., less-experienced technician) who does not have the troubleshooting training for the particular fault/error, thus a higher tier support personnel (i.e., more-experienced technician) with the needed training has to report from a location remote from the customer site. As per the SLA, the more-experienced technician must travel to the customer site and sometimes the time to travel to and from the site significantly outweighs the overall diagnosis and repair times for both the customer and the technician. However, if remote monitoring were available (which it is not in existing MEC systems) in the above case where the remote expert can see what an on-site worker sees so as to provide a live feedback loop for guided support, the total lead time for problem-solving will be significantly reduced and customer satisfaction will be improved.

Illustrative embodiments overcome the above and other challenges by providing a digital twin architecture that, inter alia, operates as a bridge between the physical and digital world, and provides remote monitoring and control for multiple users to work together which can significantly increase efficiency. Functionalities of a multi-access edge computing (MEC) system with which illustrative embodiments can be implemented will be described below in the context of FIG. 1. However, it is to be understood that embodiments are not limited to these MEC functionalities.

FIG. 1 illustrates a dynamic task offloading process 100 in a MEC system. As shown, assume a user device 102 is mobile and is configured to move (see dashed line representing a movement trail) within a MEC system comprising edge servers 104-1, 104-2, 104-3, 104-4, and 104-5 (herein collectively referred to as edge servers 104 and individually referred to as edge server 104) with corresponding base stations 106-1, 106-2, 106-3, 106-4, and 106-5 (herein collectively referred to as base stations 106 and individually referred to as base station 106), respectively, connected thereto. Each base station 106 serves as an access point for user device 102 to wirelessly connect (see bolt symbol representing a wireless link) with the corresponding edge server 104. One or more base stations 106 may also have a wired link (see solid line representing a wired link) therebetween, by way of example only, 106-1 and 106-2. Also assume that user device 102 is typically resource-limited (e.g., smart phone, laptop, tablet, unmanned aerial vehicle, self-driving vehicle, IoT device, etc.) and executes at least part of an application that requires one or more tasks (e.g., one or more AI model computations) to be offloaded and performed on a device in close proximity that has more resources (e.g., compute, storage, network, etc.) than user device 102.

In a MEC system, user device 102 offloads tasks to one or more of edge servers 104. Edge servers 104-1, 104-2, 104-3, 104-4, and 104-5 have task queues 108-1, 108-2, 108-3, 108-4, and 108-5 (herein collectively referred to as task queues 108 and individually referred to as task queue 108). A task queue 108 for each edge server 104 has a finite number of available queue entries (shown in FIG. 1 as five for illustration purposes only), and a task uploaded from a user device, e.g., user device 102, is assigned to an entry when available. Note that in FIG. 1, unavailable entries are shaded gray while available ones are not shaded. When all entries are shaded, this indicates that the given edge server cannot process any additional tasks, until one or more currently queued tasks are processed.

Further, FIG. 1 illustrates three different time instances, i.e., time slots t, t+1, and t+2, where user device 102 moves from a close proximity of one edge server 104 and its corresponding base station 106 to a close proximity of another edge server 104 and its corresponding base station 106. Thus, in time slot t of dynamic task offloading process 100, assume that user device 102 needs to offload a task and is in a close proximity of edge server 104-1 and is thus in wireless contact with base station 106-1. However, as shown, task queue 108-1 of edge server 104-1 is full (no available queue entries since edge server 104-1 is processing or scheduled to process a maximum number of tasks). Thus, when user device 102 uploads the task to edge server 104-1, edge server 104-1 sends the task to edge server 104-2 via the wired link between base stations 106-1 and 106-2. Since edge server 104-2 has availability in its task queue 108-2, the task is considered offloaded for execution to edge server 104-2. Next, in time slot t+1, assume user device 102 has moved in a close proximity to edge server 104-5 and is thus in wireless contact with base station 106-5. Since task queue 108-5 has availability, user device 102 can offload another task to edge server 104-5 for execution. Then, as shown in time slot t+2, assume user device 102 has moved in a close proximity to edge server 104-3 and is thus in wireless contact with base station 106-3. Since task queue 108-3 has availability, user device 102 can offload yet another task to edge server 104-3 for execution.

While not expressly illustrated in FIG. 1, it is to be understood that the results of execution of an offloaded task (as well as any other data) can be provided back to user device 102 by one or more of edge servers 104, e.g., either by the same edge server 104 to which user device 102 downloaded the task and/or one or more other edge servers 104 with which user device 102 is currently connected due to its mobility. Assume, in some embodiments, that each edge server 104 is able to communicate with each other edge server 104 so as to forward (via one or more hops) execution results (or any other data) to another edge server 104 that is currently in contact with user device 102.

Also, while not expressly illustrated in FIG. 1, edge servers 104 and corresponding base stations 106 (i.e., edge computing environment) are coupled to one or more cloud computing platforms (e.g., cloud computing environment which can comprise one or more private clouds, one or more public clouds, and/or one or more hybrid clouds) such that the entire MEC system environment can be considered to comprise the edge computing environment, the cloud computing environment, and one or more user devices. As will be explained in further detail herein, illustrative embodiments provide systems and methodologies for constructing and managing a digital twin architecture that virtually represents such an entire MEC system environment and/or one or more portions of the entire MEC system environment.

Figure 2:
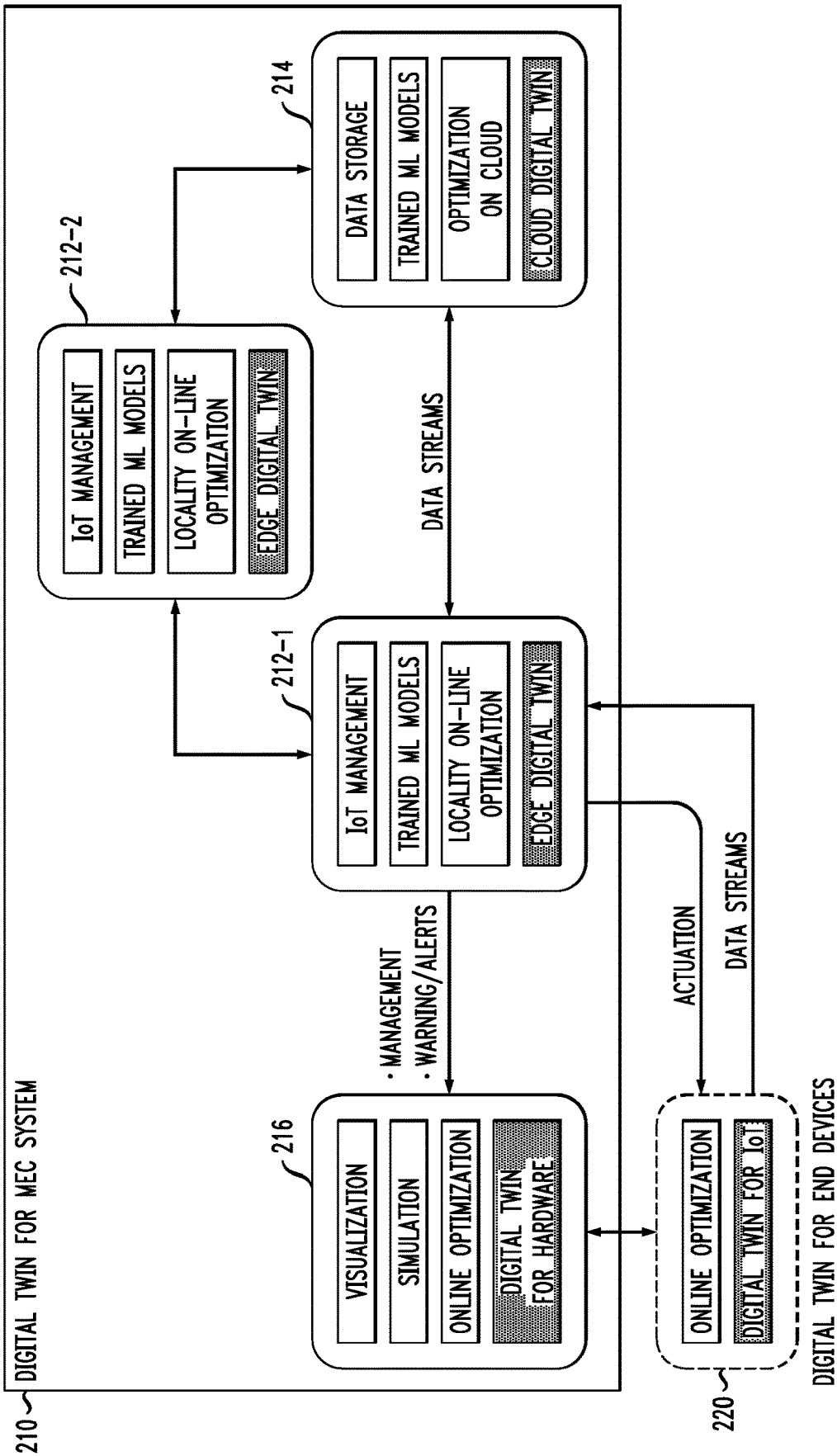
FIG. 2 illustrates a digital twin architecture for virtually representing a multi-access edge computing system according to an illustrative embodiment.

FIG. 2 illustrates a functional block diagram of a digital twin architecture 200 for a MEC system environment according to an illustrative embodiment. More particularly, digital twin architecture 200 models the entire MEC system environment including the offloading process (e.g., as illustratively described above in the context of FIG. 1) so as to determine ways to reduce latency and otherwise optimize the MEC system design. As illustratively shown, there are digital twin virtual components for each edge server (e.g., edge servers 104 in FIG. 1), e.g., only two edge digital twin virtual components 212-1 and 212-2 are illustrated in FIG. 2 for the sake of simplicity. Further, there is a cloud digital twin virtual component 214 for each cloud computing platform coupled to the edge servers (again, for the sake of simplicity, only one cloud digital twin virtual component is illustrated in FIG. 2). There is a hardware digital twin virtual component 216 for hardware associated with the edge computing environment. Still further, there is an end device digital twin virtual component 220 for one or more end devices (e.g., user device 102). Note that, in this illustrative embodiment, virtual components 212, 214 and 216 are collectively referred to as MEC system digital twin architecture 210. However, alternatively, the MEC system digital twin architecture can include virtual twin end device component 220 and/or other virtual components (not expressly shown).

More specifically, each digital twin virtual component in FIG. 2 models one or more functionalities of the actual devices that the virtual components represent. For example, as shown for each of edge digital twin virtual components 212-1 and 212-2 (herein collectively referred to as edge digital twin virtual components 212 and individually as edge digital twin virtual component 212), functionalities may include, but are not limited to, IoT management, execution of trained machine learning (ML) models, and local online optimization. Each edge digital twin virtual component 212 focuses on specific computing tasks locally and may transfer processed data to cloud digital twin virtual component 214 and/or end device digital twin virtual component 220 as needed, and messages relating to hardware management and warnings/alerts to hardware digital twin virtual component 216 as needed.

By way of further example, for cloud digital twin virtual component 214, functionalities may include, but are not limited to, data storage, execution of trained ML models, and cloud optimization. In some embodiments, cloud digital twin virtual component 214 stores data in the cloud and provides data access as well as advanced data analytics, and empirical model learning.

For hardware digital twin virtual component 216, functionalities may include, but are not limited to, hardware visualization, hardware simulation, and online hardware optimization. Still further, for end device digital twin virtual component 220, functionalities may include, but are not limited to, online optimization. It is to be understood that less functionalities or more functionalities can be implemented in the various virtual components illustrated in FIG. 2.

It is understood that the term "online" is intended to refer to the MEC system environment operating in real time, e.g., when user devices are traversing from edge server to edge server. Thus, online optimizations may include actions determined by the digital twin architecture 200 to be applied during real-time operations of the MEC system environment. It is to be appreciated that offline (non-real time) optimizations can also be determined and applied in accordance with illustrative embodiments, e.g., offline cloud optimizations.

Figure 3:
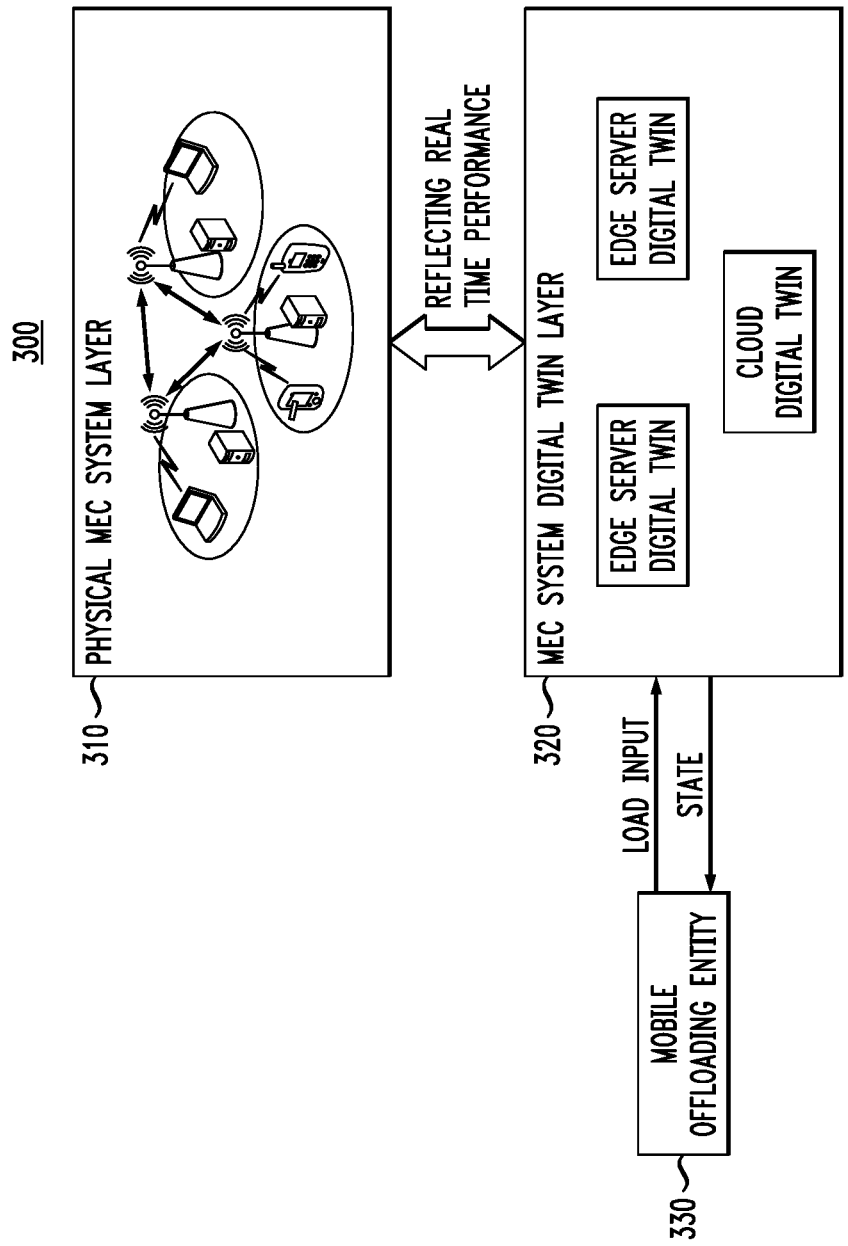
FIG. 3 illustrates data exchange between a digital twin architecture for a multi-access edge computing system, a corresponding physical multi-access edge computing system, and one or more user devices according to an illustrative embodiment.

FIG. 3 illustrates a data exchange 300 between a digital twin architecture for a MEC system (e.g., digital twin architecture in FIG. 2) and the physical MEC system (e.g., MEC system in FIG. 1) that the digital twin architecture virtually represents. More particularly, as shown in FIG. 3, a physical MEC system layer 310 is operatively coupled to a MEC system digital twin layer 320 which is operatively coupled to a mobile offloading entity 330. Mobile offloading entity 330 may be a user device (e.g., user device 102 in FIG. 1). Physical MEC system layer 310 and MEC system digital twin layer 320 exchange real-time data such as, but not limited to, reflected real-time performance data. Further, MEC system digital twin layer 320 receives load input data (e.g., information on one or more tasks to be offloaded from the user device) from mobile offloading entity 330 and estimates states of edge servers in physical MEC system layer 310 using real-time performance data received. The estimated edge server state information is then shared by MEC system digital twin layer 320 with mobile offloading entity 330 so mobile offloading entity 330 can make an optimized offloading decision.

By way of example only, MEC system digital twin layer 320 is configured to receive task queue (e.g., task queues 108 in FIG. 1) availability information and estimate whether one or more edge servers in physical MEC system layer 310 will be available to process an offloaded task for mobile offloading entity 330 now and/or at some time in the future. That is, the estimate may be based on a projection of when mobile offloading entity 330 will be in a close proximity to one or more edge servers and thus be able to connect to a corresponding base station, and whether the one or more edge servers will have task processing availability in their queues at that time. Thus, in some embodiments, the state information passed from MEC system digital twin layer 320 to mobile offloading entity 330 comprises indications of which edge servers are available and which will not be available (and, in some cases, when they will be available).

Accordingly, MEC system digital twin layer 320 is an integration and multi-model fusion of each edge server digital twin (e.g., 212 in FIG. 2) and cloud digital twin (e.g., 214 in FIG. 2) and acts as an asset twin or component twin for the entire MEC system which, advantageously, connects previously disconnected devices and provides data for optimizing the task offloading decision.

Figure 4:
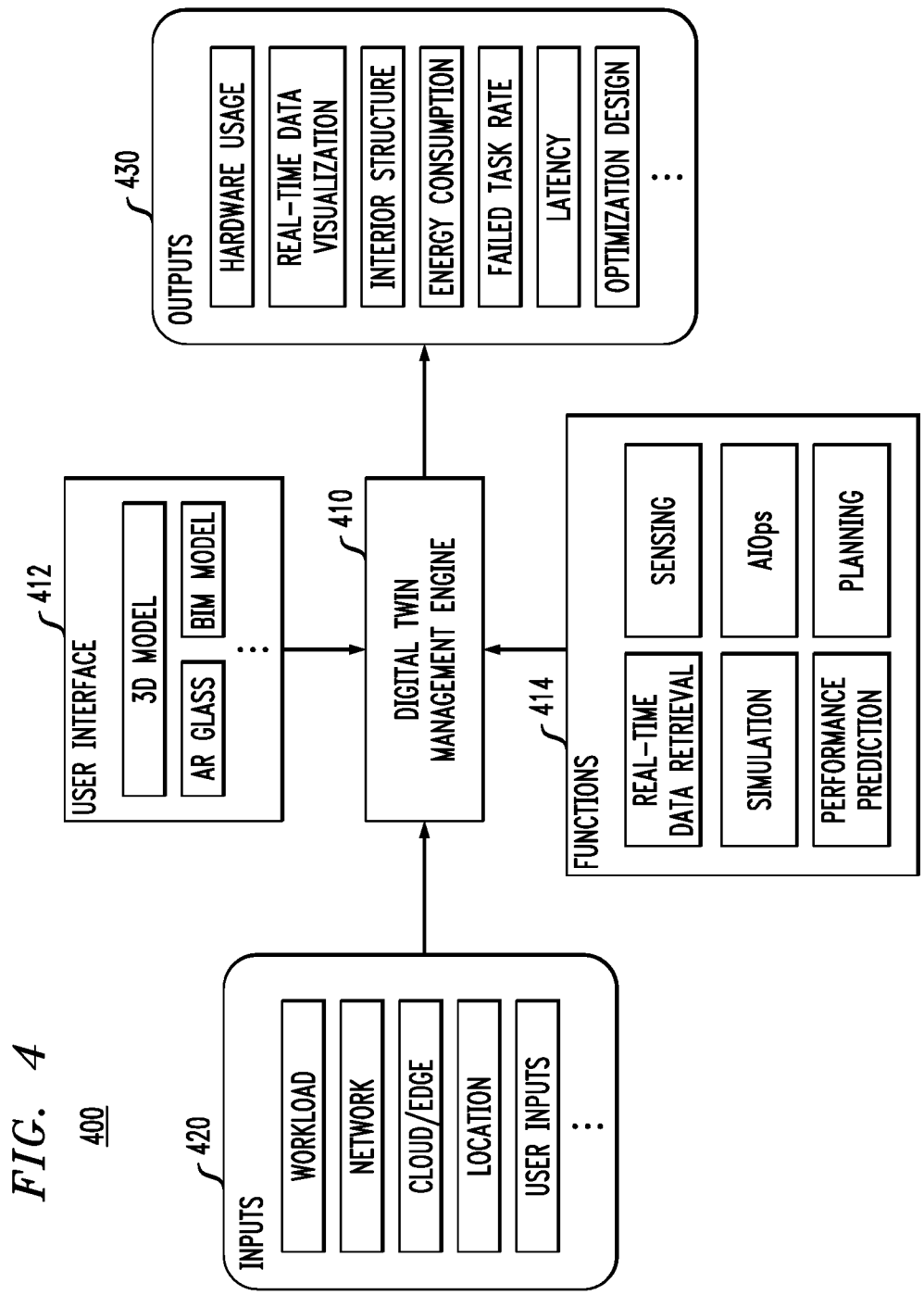
FIG. 4 illustrates a management platform for a digital twin architecture for a multi-access edge computing system according to an illustrative embodiment.

FIG. 4 illustrates a digital twin management platform 400 for a digital twin architecture for a multi-access edge computing system according to an illustrative embodiment. In illustrative embodiments, digital twin management platform 400 is implemented as part of MEC system digital twin layer 320 of FIG. 3. In general, digital twin management platform 400 takes a set of parameters into consideration and provides a digital twin-based solution to model and simulate a MEC system including, but not limited to, the task offloading process, so as to provide optimized solutions, better visualizations, remote control and monitoring, and other functionalities.

More particularly, as shown, digital twin management platform 400 comprises a digital twin management engine 410 with a user interface 412 and a set of functions 414. Digital twin management engine 410 receives a set of inputs 420 from the physical MEC system environment, (e.g., physical MEC system layer 310 and mobile offloading entity 330 as described above) and utilizes one or more of the set of functions 414 in conjunction with user interface 412 to generate and/or present a set of outputs 430.

The set of inputs 420 may comprise workload-related data, network-related data, cloud/edge-related data, location-related data, and/or user inputs which provide digital twin management engine 410 with information indicative of a wide variety of physical MEC system conditions including, but not limited to: a state of a surrounding environment of user devices uploading tasks; the time-varying nature of the system environment, user device movement trajectory; cloud/edge servers dynamics; communication and data network parameters; workloads of user devices; user device transmit power; router queuing latency; network transmission bandwidth and speed; and edge central processing unit (CPU)/virtual machine (VM) parameters. Further, the set of inputs 420 provides data indicative of a mobile offloading task including, but not limited to: the size of the offloading task; total CPU cycle number required to accomplish the offloading task; latency requirements, etc.

Digital twin management engine 410 receives the set of inputs 420 and executes one or more of the set of functions 414 including, but not limited to: real-time data retrieval; simulation; performance prediction; sensing; machine learning analytics (e.g., AIOps); and planning. Results of the execution of one or more of the set of functions 414 can be displayed or otherwise presented via user interface 412. User interface 412, in illustrative embodiments, comprises a 3D model of the physical MEC system, a building information model (BIM), and a VR/AR glass interface portion for displaying the models. Further, the example set of outputs 430 of digital twin management engine 410 include, but are not limited to: latency data including data relating to computational latency; communication latency; offloading latency; CPU utilization; energy consumption; failed task rate; optimization design/redesign of the cloud-edge system, etc.

All or portions of the aforementioned information, as well as other data, can be leveraged to conduct MEC system optimization so as to provide an improved MEC IT infrastructure which can meet demand, with lower latency, provide better use experience, with a lower cost. Furthermore, as will be explained below, illustrative embodiments support manual and automatic optimizations.

In some embodiments, manual optimization is based on simulation (e.g., simulation module in set of functions 414). For example, a user device can input different parameters into digital twin management engine 410 which runs a simulation and outputs simulated performance indices such as latency, service migration cost, energy consumption, etc. Based on the simulated results, a user can manually select and set up best options for offloading tasks to the physical MEC system.

In some embodiments, automatic optimization is based on machine learning (e.g., AIOps module in set of functions 414). For example, machine learning-based intelligence integrated within digital twin management engine 410 enables operators to bring together previously unconnected systems to gain new insights, optimize the offloading process, provide intelligent offloading decisions, and monitor processes remotely. The offloading decision management generates optimal offloading decisions according to continuously monitored input information of the digital twin architecture, physical environment, and network parameters, etc.

For example, an output of set of outputs 430 comprises an optimized setup for offloading, e.g., assign certain edge servers to tasks from certain user devices based on current edge resources available as well as latency requirements from user devices. For mobile user devices, the optimized setup can include finding the nearest edge servers for certain IoT devices under the constraints of minimizing latency. Another output of set of outputs 430 comprises anomaly detection and prediction for the entire MEC system and recommendations for issue resolution.

By way of further example, different schemes for an offloading decision can be considered: minimize the offloading latency under the constraint of accumulated consumed service migration cost during user mobility; and minimize the service migration cost under the constraint of offloading latency during user mobility.

As mentioned above, user interface 412 can be installed as part of an AR glass in which a user can remotely visualize a 3D model of the physical MEC system (e.g., a visualization that digitally displays the MEC system shown in FIG. 1), navigate in the model to view the structure, use gestures/controllers to retrieve real-time data or digital information, and conduct remote monitoring and control as needed. The user can also receive and manage warning or alerts remotely via user interface 412.

If there are any alerts/warnings, or troubleshooting requests received, the user can log into digital twin management engine 410, check the alert in the system, whereby the system automatically navigates the user to the location where the problem occurs, and provides intelligent suggestions about how to deal with the issue. Multiple users can conduct remote management and/or troubleshooting together with a shared view. Advantageously, management platform 400 generates visualizations of the status/behavior of the physical MEC system in real time, simulations and test assumptions about the offloading process, optimizations and evaluations about offloading decisions during user mobility between different edge servers, intelligent offloading decisions based upon analytics, and AR/VR based visualizations and remote control functionalities.

Advantageously, digital twin management engine 410 is configured to generate a 3D model which, in some embodiments, is a reduced order model for hardware used as a visualization and interaction interface (e.g., server, storage, switch, etc.). For various hardware scenarios, digital twin management engine 410 is also configured to generate a 3D model for racks, sensors, data center layouts or a BIM for a building. While 3D modeling has many advantages, digital twin management engine 410 can additionally or alternatively generate discrete event-based models or agent-based models. In some embodiments, digital twin management engine 410 is configured to utilize the following data for building a digital twin: historical data and real-time operation data from sources such as, but not limited to, Zabbix and iDrac; historical data and real-time sensing data for all IoT device; network and environmental data; user data; movement trajectory data, etc. For simulation, in some embodiments, digital twin management engine 410 utilizes IT architecture simulation software such as CloudSim or EdgeCloudSim to simulate the cloud-edge architecture and simulate performance of a given product. For analytics and prediction, in some embodiments, digital twin management engine 410 uses AI algorithms to realize anomaly prediction and determine optimal configurations. As mentioned, visualization can be AR-based, including Smart pad or AR glass, in some embodiments.

EdgeCloudSim is a simulation environment specific to edge computing scenarios. EdgeCloudSim is based on CloudSim but adds some additional functionalities such as network modeling specific to WLAN and WAN, device mobility model, and a realistic and tunable load generator. Digital twin management engine 410 is configured to utilize or otherwise adapt such simulation software to provide the following illustrative functions: modeling and simulation of large-scale cloud/edge computing environments; modeling and simulation of network connections; and simulation of the mobile offloading process. Simulation of the MEC system environment has many benefits such as, by way of example: testing services in a repeatable and controllable environment; tuning system bottlenecks before deployment on real clouds; and simulating infrastructure to evaluate different sets of workload as well as resource performance.

Figure 5:
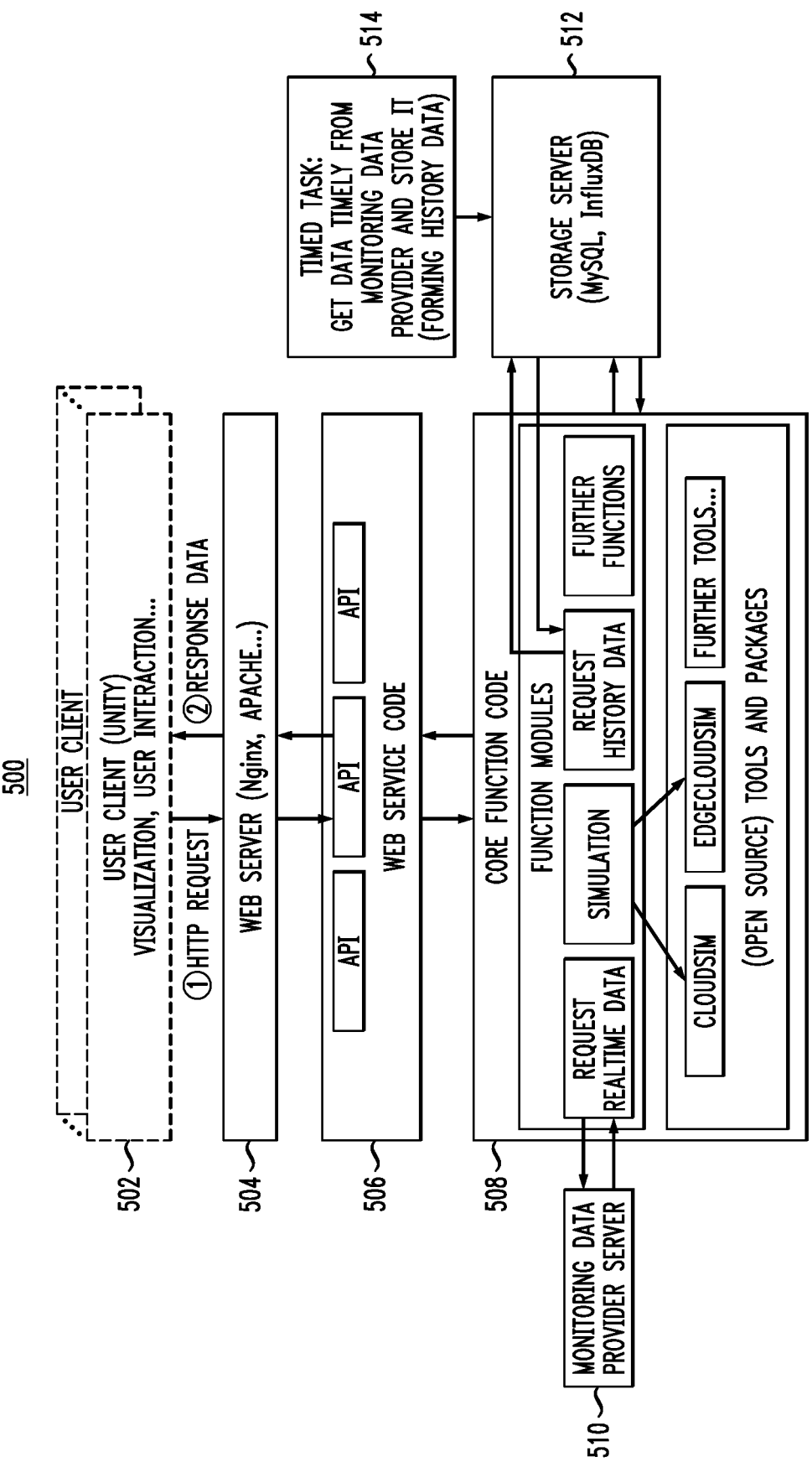
FIG. 5 illustrates a service architecture for a digital twin architecture for a multi-access edge computing system according to an illustrative embodiment.

As mentioned above, functionalities of a digital twin architecture, as described herein, can be offered as a service to client such as, but not limited to, MEC system providers. A service architecture 500 for a digital twin architecture for a MEC system environment, according to an illustrative embodiment, is shown in FIG. 5. As shown, one or more clients 502 (herein referred to as client 502 or clients 502) can access the service architecture via a web server 504. Web service code 506 (one or more application programming interfaces or APIs) enable access to core function code 508 which provides a plurality of digital twin architecture functionalities described herein including, but not limited to, access to monitoring data from a monitoring data provider server 510, storage access from a storage server 512 configured to store historical data 514, simulation, etc.

The service architecture 500 enables a client 502 to visualize data in a 3D environment, interact with the model, and manipulate information by interaction with the virtual environment. Using an AR or VR headset, the client 502 can view the 3D model as well as all the data in real time from multiple perspectives. Different categories of data that can be visualized including, but not limited to, system model and architecture data; real-time system data that is interpreted and contextualized; simulation output data; and analyzed data. These different categories of virtual information can be automatically presented, or client 502 can use gestures or a controller to pull out information of interest. Client 502 can interact with the data, obtain insights, make decisions and take actions accordingly.

Core function code 508 can include (further functions) machine learning-based data analytics that generates recommendations for offloading optimization, and computes predictions for future trends as well as: suggestions on optimization between parameters; recommendations for current and future operations; potential risk reminders; and resource allocation and management. Data sources for machine learning can include: physical parameters; sensing data; historical and real-time hardware performance data; historical and real-time environment parameters; user device parameters and trajectory; knowledge database; risk models; and expert models or databases.

Advantageously, with digital twin-based service architecture 500, a client 502 does not need to go onsite to the physical system to check status; rather, client 502 can check status via digital twin-based service architecture 500 for remote monitoring. When any issue occurs, remote collaboration can be enabled: both the onsite and remote technicians (clients 502) can have shared views in AR or VR of the situation. If a problem is detected, they can work together in the AR or VR environment remotely, and resolve the issue together.

Furthermore, a digital twin architecture as described herein has many benefits and advantages over existing solutions including, but not limited to, better visibility by continually viewing operations of the MEC system or devices, and the status of their interconnected systems in a more interactive and real-time manner; accurate prediction by retrieving future state from the digital twin model by using simulation or modeling; simulate unique conditions and perform what-if analysis using digital twin interfaces to obtain optimized solutions or setups; intelligence via automatic optimization for offloading with tradeoff between different parameters based on use cases or scenarios; remote monitoring and control of the physical system by controlling the virtual copy of the physical system; and documentation and communication in that the digital twin model helps clients to understand, document, and explain the behavior of a specific scenario.

The concept of developing a digital twin architecture for a MEC system is unique in that illustrative embodiments provide a digital twin for the edge environment, a digital twin for the cloud environment, a digital twin for the entire MEC system, a digital twin for IoT devices, and all of them being able to integrate and collaborate to bring an intelligent solution to model, simulate and optimize the operations and designs of a MEC system.

Existing optimizations for MEC systems are based on purely mathematical solutions. Illustrative embodiments provide novel simulation of a MEC system from which a user can run different simulations and manually select optimization solutions, and provide AI and data analytics to obtain optimized solutions for task offloading in a MEC system.

In addition, the digital twin architecture can simulate and estimate boundary conditions for a MEC system. This is especially helpful in extreme cases, where a user can test the limitations of the system, and adapt the MEC system to prevent the extreme cases from ever occurring.

Still further, the proposed platform allows multiple users managing, troubleshooting the IT infrastructure together with shared view in immersive AR or VR environment.

Digital twins enable remote commissioning and diagnostics of products that are already in the field thereby lowering service costs and improving customer satisfaction. AR/VR can serve as a user interface to help workers easily navigate and manipulate the MEC system.

Real-time communication of ideas, concepts and interaction while performing remote monitoring and troubleshooting enables all parties to more quickly reach a full appreciation of current status, the potential solutions, and visualize immediate results as quickly as possible.

Digital twins involve ingesting large volumes of data in order to arrive at actionable insights. AR and VR offer immersive experiences to visualize such insights. In accordance with illustrative embodiments, a stakeholder can interact with a wearable or a hand-held AR/VR device to consume insights and queries in a context-aware manner. A MEC system produces massive amounts of data from monitoring and security tools, and the data can be processed and displayed in ways that are useful and user friendly to stakeholders, workers, engineers, and technicians. Integrating AR/VR with digital twin functionalities in illustrative embodiments can help workers quickly and effectively view information.

FIG. 6 illustrates a methodology 600 for a digital twin architecture for a multi-access edge computing system according to an illustrative embodiment. Step 602 generates a virtual representation (e.g., one or more digital twin models) of a multi-access edge computing system environment. Step 604 manages the multi-access edge computing system environment via the virtual representation. Illustrative details and examples of these steps are explained in detail herein.

FIG. 7 illustrates a block diagram of an example processing device or, more generally, an information processing system 700 that can be used to implement illustrative embodiments. For example, one or more components in FIGS. 1-6 can comprise a processing configuration such as that shown in FIG. 7 to perform steps/operations described herein. Note that while the components of system 700 are shown in FIG. 7 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 700 can include multiple processing devices, each of which comprise the components shown in FIG. 7.

As shown, the system 700 includes a central processing unit (CPU) 701 which performs various appropriate acts and processing, based on a computer program instruction stored in a read-only memory (ROM) 702 or a computer program instruction loaded from a storage unit 708 to a random access memory (RAM) 703. The RAM 703 stores therein various programs and data required for operations of the system 700. The CPU 701, the ROM 702 and the RAM 703 are connected via a bus 704 with one another. An input/output (I/O) interface 705 is also connected to the bus 704.

The following components in the system 700 are connected to the I/O interface 705, comprising: an input unit 706 such as a keyboard, a mouse and the like; an output unit 707 including various kinds of displays and a loudspeaker, etc.; a storage unit 708 including a magnetic disk, an optical disk, and etc.; a communication unit 709 including a network card, a modem, and a wireless communication transceiver, etc. The communication unit 709 allows the system 700 to exchange information/data with other devices through a computer network such as the Internet and/or various kinds of telecommunications networks.

Various processes and processing described above may be executed by the CPU 701. For example, in some embodiments, methodologies described herein may be implemented as a computer software program that is tangibly included in a machine readable medium, e.g., the storage unit 708. In some embodiments, part or all of the computer programs may be loaded and/or mounted onto the system 700 via ROM 702 and/or communication unit 709. When the computer program is loaded to the RAM 703 and executed by the CPU 701, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    in a multi-access edge computing system environment comprising one or more cloud computing portions operatively coupled to a plurality of edge computing portions, and a user device portion, the plurality of edge computing portions having respective task queues for executing a task;
    generating a virtual representation of the multi-access edge computing system environment; and
    managing the multi-access edge computing system environment via the virtual representation;
    wherein the generating step further comprises generating a virtual representation of: a given one of the edge computing portions of the multi-access edge computing system environment;
    a given one of the cloud computing portions of the multi-access edge computing system environment; and the user device portion of the multi-access edge computing system environment;
    wherein the managing step further comprises generating a recommendation for offloading one or more tasks between select ones of the edge computing portions, the cloud computing portions and the user device portion;
    wherein generating a recommendation comprises receiving task queue availability information from the plurality of edge computing portions for executing the one or more tasks and predicting whether a given one of the edge computing portions is available to process an offloaded task based on one or more of a projection of when the user device portion will be in a proximity to one or more of the edge computing portions, and whether one or more of the edge computing portions will have task processing availability in their respective task queues; and
    wherein the generating and managing steps are performed by at least one processor and at least one memory storing executable computer program instructions.

2. The method of claim 1, wherein the generating step further comprises generating a virtual representation of a hardware portion of the multi-access edge computing system environment.

3. The method of claim 1, wherein managing the multi-access edge computing system environment via the virtual representation further comprises simulating one or more operations of the multi-access edge computing system environment.

4. The method of claim 3, wherein managing the multi-access edge computing system environment via the virtual representation further comprises generating one or more visualizations of the multi-access edge computing system environment in response to the simulating step.

5. The method of claim 4, wherein managing the multi-access edge computing system environment via the virtual representation further comprises presenting one or more visualizations of the multi-access edge computing system environment on a virtual or augmented reality interface.

6. The method of claim 1, wherein managing the multi-access edge computing system environment via the virtual representation further comprises predicting one or more states of the multi-access edge computing system environment.

7. The method of claim 6, wherein generating the recommendation for one or more task offloading decisions is performed in response to the predicting step.

8. The method of claim 6, wherein predicting one or more states of the multi-access edge computing system environment further comprises utilizing one or more machine learning algorithms for predictions.

9. The method of claim 1, wherein managing the multi-access edge computing system environment via the virtual representation further comprises enabling one or more clients to manage the multi-access edge computing system remotely.

10. The method of claim 1, wherein managing the multi-access edge computing system environment via the virtual representation further comprises enabling multiple clients to collaborate in managing the multi-access edge computing system.

11. The method of claim 1 wherein the virtual representation comprises a representation of the offloading of the one or more tasks between select ones of the edge computing portions, the cloud computing portions and the user device portion.

12. The method of claim 1 wherein:
    the edge computing portions of the multi-access edge computing system environment comprise one or more edge servers; and
    the user device portion of the multi-access edge computing system environment comprises one or more mobile user devices;
    wherein generating a recommendation for offloading one or more tasks comprises offloading the one or more tasks from the one or more mobile user devices to the one or more edge servers based at least in part of proximity of the one or more mobile user devices to the one or more edge servers and availability of resources of the one or more edge servers.

13. The method of claim 12 wherein the virtual representation comprises a representation of the offloading of the one or more tasks from the one or more mobile user devices to the one or more edge servers.

14. A computer program product stored on a non-transitory computer-readable medium and comprising machine executable instructions, the machine executable instructions, when executed, causing a processing device to perform steps of:

generating a virtual representation of a multi-access edge computing system environment, the multi-access edge computing system environment comprising one or more cloud computing portions operatively coupled to a plurality of edge computing portions, and a user device portion, the plurality of edge computing portions having respective task queues for executing a task; and managing the multi-access edge computing system environment via the virtual representation;

wherein the generating step further comprises generating a virtual representation of: a given one of the edge computing portions of the multi-access edge computing system environment;

a given one of the cloud computing portions of the multi-access edge computing system environment; and the user device portion of the multi-access edge computing system environment;

wherein enabling management of the multi-access edge computing system environment via the virtual representation further comprises generating a recommendation for offloading one or more tasks between select ones of the edge computing portions, the cloud computing portions and the user device portion; and wherein generating a recommendation comprises receiving task queue availability information from the plurality of edge computing portions for executing the one or more tasks and predicting whether a given one of the edge computing portions is available to process an offloaded task based on one or more of a projection of when the user device portion will be in a proximity to one or more of the edge computing portions, and whether one or more of the edge computing portions will have task processing availability in their respective task queues.

15. The computer program product of claim 14, wherein the virtual representation comprises one or more digital twin models of the multi-access edge computing system.

16. An apparatus, comprising:
at least one processor and at least one memory storing computer program instructions wherein, when the at least one processor executes the computer program instructions, the apparatus is configured to:

generate a virtual representation of a multi-access edge computing system environment, the multi-access edge computing system environment comprising one or more cloud computing portions operatively coupled to a plurality of edge computing portions, and a user device portion, the plurality of edge computing portions having respective task queues for executing a task; and enable management of the multi-access edge computing system environment via the virtual representation;

wherein the generating step further comprises generating a virtual representation of: a given one of the edge computing portions of the multi-access edge computing system environment;

a given one of the cloud computing portions of the multi-access edge computing system environment; and the user device portion of the multi-access edge computing system environment;

wherein enabling management of the multi-access edge computing system environment via the virtual representation further comprises generating a recommendation for offloading one or more tasks between select ones of the edge computing portions, the cloud computing portions and the user device portion; and wherein generating a recommendation comprises receiving task queue availability information from the plurality of edge computing portions for executing the one or more tasks and predicting whether a given one of the edge computing portions is available to process an offloaded task based on one or more of a projection of when the user device portion will be in a proximity to one or more of the edge computing portions, and whether one or more of the edge computing portions will have task processing availability in their respective task queues.

17. The apparatus of claim 16, wherein enabling management of the multi-access edge computing system environment via the virtual representation further comprises simulating one or more operations of the multi-access edge computing system environment.

18. The apparatus of claim 16, wherein enabling management of the multi-access edge computing system environment via the virtual representation further comprises predicting one or more states of the multi-access edge computing system environment.

19. The apparatus of claim 16, wherein the virtual representation comprises one or more digital twin models of the multi-access edge computing system.

20. The apparatus of claim 16, wherein:
the edge computing portions of the multi-access edge computing system environment comprise one or more edge servers;

the user device portion of the multi-access edge computing system environment comprises one or more mobile user devices;

wherein generating a recommendation for offloading one or more tasks comprises offloading the one or more tasks from the one or more mobile user devices to the one or more edge servers based at least in part of proximity of the one or more mobile user devices to the one or more edge servers and availability of resources of the one or more edge servers; and wherein the virtual representation comprises a representation of the offloading of the one or more tasks from the one or more mobile user devices to the one or more edge servers.

* * * * *